United States Patent [19]

Lu et al.

[11] Patent Number: 5,432,864
[45] Date of Patent: Jul. 11, 1995

[54] IDENTIFICATION CARD VERIFICATION SYSTEM

[75] Inventors: Daozheng Lu, 1903 Dunloe Cir., Dunedin, Fla. 34698; Simon W. Lu, 525 S. Berendo St. #303, Los Angeles, Calif. 90020

[73] Assignees: Daozheng Lu; Simon W. Lu, ; a part interest

[21] Appl. No.: 956,180

[22] Filed: Oct. 5, 1992

[51] Int. Cl.$^6$ .............................................. G06K 9/46
[52] U.S. Cl. .................................. 382/118; 382/190; 340/825.34
[58] Field of Search ............................ 382/2, 4, 1, 16; 340/825.34, 825.33

[56] References Cited

U.S. PATENT DOCUMENTS

| | | | |
|---|---|---|---|
| 3,805,238 | 4/1974 | Rothfjell | 382/2 |
| 4,449,189 | 5/1984 | Feix et al. | 382/2 |
| 4,712,103 | 12/1987 | Gotanda | 340/825.31 |
| 4,754,487 | 6/1988 | Newmuis | 382/2 |
| 4,811,408 | 3/1989 | Goldman | 382/2 |
| 4,858,000 | 8/1989 | Lu | 382/2 |
| 4,972,476 | 11/1990 | Nathans | 340/825.34 |
| 4,975,969 | 12/1990 | Tal | 382/2 |
| 4,991,205 | 2/1991 | Lemelson | 340/825.33 |
| 4,993,068 | 2/1991 | Piosenka et al. | 382/2 |
| 4,995,086 | 2/1991 | Lilley et al. | 382/4 |
| 5,031,228 | 7/1991 | Lu | 382/38 |
| 5,053,608 | 10/1991 | Senanayake | 340/825.34 |
| 5,063,603 | 11/1991 | Burt | 382/37 |
| 5,164,992 | 11/1992 | Turk et al. | 382/2 |

OTHER PUBLICATIONS

Hall, Ernest L. "Computer Image Processing and Recognition" Academic Press, 1979, pp. 370–375 and 115–119.

Shackleton et al., WO 92/02000, (International Application Published Under the Patent Cooperation Treaty), 6 Feb. 1992.

Kirby et al, "Application of the Karhuneu–Loeve procedure for the Characterization of Human Faces". IEEE Trans. on Pat. Analysis and Mach. Int., Jan. 1990, pp. 103–108.

Shackleton and Welsh "Classification of Facial Features for Recognition" Proc. 1991 IEEE Computer Society Conf. Comp. Vision and Pat Rec., Jun. 1991, pp. 573–579.

Sutherland, et al. "Automatic Face Recognition" First Int. Conf. on Intelligent Systems. pp. 29–34. Aug. 21, 1992.

Turk et al. "Face Recognition Using Eigenfaces" Proc. 1991 Comp. Soc. Conf. on Computer Vision and Pat. Recog. pp. 586–591 Jun. 6, 1991.

*Primary Examiner*—Michael T. Razavi
*Assistant Examiner*—Jon Chang
*Attorney, Agent, or Firm*—David Kiewit

[57] ABSTRACT

The present invention provides apparatus and method for verifying the identity of a person by comparing that person's face (or selected facial features) with an image generated using data stored on an identification card, badge, tag or other escort memory carried by the person. Both automatic and manual verification apparatus are disclosed, and both employ principal component methods that reduce the amount of data required to be carried by the bearer to under 100 bytes. The process of verifying identity involves combining data from the small escort memory with other image-related data that are general in nature and that are stored at the verification location. The system of the present invention is expected to find use in a wide variety of cases where a person's identity is to be established (e.g. by a retail customer using a credit card, by a traffic officer who needs to verify the identity noted on a driver's license, by an industrial security system that regulates the access by selected personnel into a secure area of a plant or business, or by a customer of an automatic teller machine.)

4 Claims, 8 Drawing Sheets

EFP sequence                    1234567890123456789012345678901234567890

Prestored EFP                   0003403000002008000000120050200080200000000090010000005000500
from ID card EFP from                        0004303000002007100000120050200080200000000081010000005000500
ID bearer (1)

EFP from                        0550000000000091000000160000300000006400000200800040000600000
ID bearer (2)

If the approval threshold T1=10, and denial threshold T2=20, then:

The difference between bearer (1) and ID card EFP is 6 and it is less than T1.
So bearer (1) should be approved.

The difference between bearer (2) and ID card EFP is 102 and it is greater than
T2. So bearer (2) should be denied.

Figure 8

IDENTIFICATION CARD VERIFICATION SYSTEM

BACKGROUND OF THE INVENTION

The present invention provides apparatus and method for verifying the identity of a person by comparing that person's face with a facial image generated using data stored on an identification card, badge or tag carried by the person. The present invention also provides apparatus and method for verifying the identity of a person by extracting pattern signatures from an image of that person's face and comparing those signatures with data stored on an identification card, tag, or badge carried by the person. The system of the present invention is expected to find use in a wide variety of cases where a person's identity is to be established (e.g. by a retail customer using a credit card, by a traffic officer who needs to verify the identity noted on a driver's license, by an industrial security system that regulates the access by selected personnel into a secure area of a plant or business, or by a customer of an automatic teller machine.)

The prior art is replete with verification systems that have attempted to store a digitized, encoded representation of an identifying image on a card, badge, etc. that could be easily carried by a person. A major problem that has been recognized implicitly or explicitly by many prior art inventors is that of securing adequate memory capacity for storing an encoded representation of a person's face on a medium that can be easily carried and that can be read out and displayed or analyzed at the point of identification. Notable among the prior art patents are the following:

U.S. Pat. No. 3,805,238, wherein Rothfjell teaches an identification system in which major features (e.g. the shape of a person's nose in profile) are extracted from an image and stored. The stored features are subsequently retrieved and overlaid on a current image of the person to verify identity. Rothfjell attacked the data capacity problem by using only parts of an image—i.e. a feature set that could be represented by a small number of pixels.

U.S. Pat. No. 4,449,189, wherein Feix et al provide an identification system in which a spoken phrase and a digitized image of the speaker's mouth at the time he or she is uttering the phrase are recorded on a card. When the person's identity is to be later verified, he/she speaks the same words and both the vocal signature and the mouth image are compared with the recorded data. Feix et al address the problem of video data reduction by using only a restricted portion of the available image. The disclosure of Feix et al is herein incorporated by reference.

U.S. Pat. No. 4,712,103, wherein Gotanda teaches, inter alia, storing a digitized facial image in non-volatile ROM on a key, and retrieving that image for comparison with a current image of the person at the time he/she requests access to a secured area. Gotanda describes the use of image compression, by as much as a factor of four, to reduce the amount of data storage capacity needed by the ROM that is located on the key.

U.S. Pat. No. 4,754,487, wherein Newmuis teaches a system for storing a facial image for subsequent display. In order to reduce the amount of data that needs to be stored, Newmuis uses a variable sampling rate. A high spatial frequency is employed in critical portions of the face (Newmuis teaches that a "T"-shaped region encompassing the eyes, nose and mouth is most important). Lower spatial sampling rates are used for other portions of the facial image.

U.S. Pat. No. 4,811,408, wherein Goldman teaches a document identification system that compares selected portions of a photographic image on an identification card with encoded representations of those selected portions and alerts an operator as to points of mismatch. Goldman's use of selected portions of the image serves to reduce the amount of data that needs to be stored.

U.S. Pat. No. 4,858,000 wherein Lu teaches an image recognition system and method for identifying ones of a predetermined set of individuals, each of whom has a digital representation of his or her face stored in a defined memory space. The system of this invention also provides means of locating, within a monitored area, an individual face that is to be identified. The disclosure of U.S. Pat. No. 4,858,000 is herein incorporated by reference.

U.S. Pat. No. 4,991,205, wherein Lemelson teaches encoding physical characteristics (one of which is a scrambled video image of a face) on a magnetic stripe of the type that is commonly seen on credit cards. The encoded characteristic is used in identification systems that may be manual (e.g. the recorded image is reconstituted on a CRT so that an operator can compare the person carrying the card with the re-constituted picture) or automatic (e.g. a recorded voice print is compared with a special phrase spoken into a microphone at an access control point). Although Lemelson specifically recites encoding one or more full frames of video on a magnetic medium on a card, and then reading and displaying that video image, the subsequent discussion will show that such a scheme would not work if the magnetic medium were constrained to have the very low total memory capacity of a standard credit card magnetic stripe.

U.S. Pat. No. 4,972,476, wherein Nathan teaches scrambling and encoding a picture of a portion of a person, and storing that representation on an ID card. The reconstituted image is superimposed on a current image of the person so that a clerk or guard can check the degree of correspondence. Nathan's use of a restricted portion of a facial image (e.g. an ear) reduces the amount of data that needs to be stored within the limited capacity of a magnetic stride on a card.

U.S. Pat. No. 4,975,969, wherein Tal teaches an image recognition system and method in which ratios of facial parameters (which Tal defines as distances between definable points on facial features such as a nose, mouth, eyebrow etc.) are measured from a facial image and are used to characterize the individual. Tal, like Lu in U.S. Pat. No. 4,858,000, uses a binary image to find facial features. The disclosure of Tal is herein incorporated by reference.

U.S. Pat. No. 4,993,068, wherein Piosenka and Chandos teach an automatic personal identification system in which biometric data specific to a person to be identified are carried by that person in an escort memory, an automatic comparison is later made between those stored biometric data and corresponding biometric data collected at a place and time at which the person is to establish his or her identity.

U.S. Pat. No. 4,995,086, wherein Lilley and Ridgeway teach a method of recording a feature set that characterizes a fingerprint on magnetic stripes on an ID card. Rather than store an entire fingerprint image on the card, Lilley et al analyze the fingerprint and store an encoded representation of the degree of correlation between the card bearer's fingerprint and a standard reference fingerprint. A readout machine has a fingerprint sensor and compares the stored data with corresponding data extracted from a current fingerprint.

U.S. Pat. No. 5,031,228, wherein Lu teaches an image recognition system and method for identifying ones of a predetermined set of individuals, each of whom has a digital representation of his or her face stored in a defined memory space. Face identification data for each of the predetermined individuals are also stored in a Universal Face Model block that includes all the individual pattern image or face signatures stored within the individual face library. The disclosure of U.S. Pat. No. 5,031,228 is herein incorporated by reference.

U.S. Pat. No. 5,063,603, wherein Burt teaches an image recognition system using differences in facial features to distinguish one individual from another. Burt's system uniquely identifies individuals whose facial images and selected facial feature images have been learned by the system. Burt's system also "generically recognizes" humans and thus distinguishes between unknown humans and non-human objects by using a generic body shape template. The disclosure of U.S. Pat. No. 5,063,603 is herein incorporated by reference.

U.S. Pat. No. 5,053,608, wherein Senanayake teaches the use of a personal ID card system that has a fingerprint encoded on it. The card also has a special space where the bearer can temporarily leave his fingerprint. A reading machine decodes the encoded fingerprint (e.g. stored on a magnetic stripe) and compares it with the current fingerprint made on the special space in order to verify identity.

U.S. Pat. No. 5,164,992, wherein Turk and Pentland teach the use of an Eigenface methodology for recognizing and identifying members of a television viewing audience. The disclosure of Turk et al is herein incorporated by reference.

Although many inventors have offered approaches to providing an encoded facial image that could be compared, automatically or manually, at some later time to verify that a card-bearer is indeed the properly authorized card-holder, none have succeeded in producing a viable system. Part of the reason for this lies in the severe constraints imposed on the image storage aspect of a system by commercially available read-out apparatus that is widely employed for reading data stored on magnetic stripes on credit cards and the like.

The reading equipment that is used for retrieving data stored on credit cards commonly calls for an operator to manually move the magnetic stripe on the card through a slot that contains a read-out head. The equipment must thus tolerate both a wide range of speeds used by different operators, and variations of speed during a single scan. Because of these constraints imposed by manual scanning, data are conventionally stored on magnetic stripes on credit cards at a very low density. Financial transaction cards that are in widespread use are defined in ISO Standard 7813 and conventionally have three such low density tracks. Track 1 (defined in Standard ISO 7811-4) was developed by the international Air Transport Association and can contain up to 79 alphanumeric characters, using 7 bits per character. Track 2 (also defined in Standard ISO 7811-4), was developed by the American Bankers Association and contains up to 40 numeric characters at 5 bits per character. Track 3 (defined in ISO 7811-5) was developed by the Thrift Industry and contains up to 107 characters at 5 bits per character.

Comparing the data storage space available on a card (25–69 bytes per track and a maximum of 3 tracks per stripe for a total of 160 bytes), with the data generated by digitizing a video frame (on the order of 0.25–1 million bytes) shows the scope of the problem that is to be solved if the credit card format is to be used. Small amounts of image compression, as taught e.g. by Gotanda, overflow the available memory a thousandfold. Sophisticated data reduction methods, such as those provided by a recent JPEG standard, can reduce an image to about 10,000 to 50,000 bytes, which is still a factor of 60–300 more than is available on the entire card. Moreover, since much of the data storage space on a card is likely to be reserved for other purposes (e.g. Track 1 may store the cardholder's name, and Track 2 may have a personal identification number for use with an automatic teller machine) the amount of space left for image storage is even smaller (continuing the example started above, one would find a total space of 66 bytes on Track 3 available for storage of an image). Thus, the best known methods of image compression would require 180–1000 times more memory space than is available on a single track.

Other storage media, such as an optical memory card configured according to the de facto "DELA" standard (compatible with ANSI Draft Standard X3B10.4), can provide adequate memory capacity to store a facial image or digitized record of some other characteristic (e.g. a fingerprint), and have been considered for use in identity verification systems. Such systems have not been widely successful, partly because of the higher cost of optical cards vs magnetic stripe cards, but mostly because of the lack of a network of readers (which are far more expensive than are the comparable magnetic stripe readers).

Several authors, among them M. Turk and A. Pentland, ("Eigenfaces for Recognition", Journal of Cognitive Neuroscience, vol. 3, no. 1, pp 71–86, 1991) have taught the use of an "Eigenface" approach to face recognition. In this method a standard set of faces (or features) that span the gamut of faces (or features) that are to be encountered is initially defined, and all subsequent facial (feature) images are expressed as a weighted combination of the standard set. Turk and Pentland's Eigenface approach is a specific example of principal component methodologies that seek to express a variable (in this case, an image) as a combination of principal components. A more familiar principal component method is the use of latitude and longitude to locate a location on a map.

The use of principal component (or Eigenvector) mathematical theory in a variety of signal processing and signal reconstruction applications is well-known. Illustrative of the varying applications of this methodology are:

U.S. Pat. No. 5,009,143, wherein Knopp teaches the use of principal component methods to reconstruct preselected musical signals. The disclosure of Knopp is herein incorporated by reference.

U.S. Pat. No. 5,031,155, wherein Hsu teaches the use of both Karhunen-Loeve transformations and Hilbert transformations to form Eigenvector representations of well-logging data. Hsu teaches the use of already established principal component methods to: 1) provide a compressed representation of sonic signals (in terms of eigenvectors and other parameters): 2) process the sonic data (by deleting some eigenvectors and thereafter using a reduced set of eigenvectors to characterize the data) in order to remove noise and measurement artifacts; and 3) reconstruct the wave components by inverse transformations. The disclosure of Hsu is herein incorporated by reference.

U.S. Pat. No. 5,179,598, wherein DiFoggio and Burleigh teach the use of eigenvector methods to determine which portions of an image are of the same color. The disclosure of DiFoggio et al., is herein incorporated by reference.

Lu et al, in U.S. patent application Ser. No. 07/872,881, teach the use of an "Eigenface" or "Eigenfeature" approach for recognizing persons who shop multiple times at a monitored retail store. The disclosure of Lu et al is herein incorporated by reference. The system of Ser. No. 07/872,881 employs Eigenface analysis as a means of speeding the process of recognizing (rather than verifying) ones of a number of known people. Lu et al did not teach a physical partitioning of computer memory so as to place the standard set in one physical location (e.g. on a magnetic disk drive associated with the recognition computer) and the set of weights that related a predetermined individual's face to faces in the standard set in another location (e.g. on a magnetic stripe on a credit card).

SUMMARY OF THE INVENTION

The present invention provides means of dramatically reducing the volume of data that must be carried in an escort memory (e.g. a magnetic stripe on a credit card) and thereby provides a practical system of personal identity verification in which data on a personally borne medium is combined with data present at a verification terminal in order to generate an image of the bearer's face or principal facial features.

It is an object of the invention to provide method and apparatus for verifying the identity of a person by comparing the person's face with a facial image that is generated using data stored on an identification cards, badge, or tag carried by the person. Hence, it is a specific objective of the invention to provide such method and apparatus for use with a conventional magnetic-striped credit card. It is a further specific objective of the invention to provide such method and apparatus for use with an electrically powered card or tag that can automatically transmit a small amount of data to a verification receiver when it is interrogated as its bearer approaches a control point.

It is a further object of the invention to provide method and apparatus for verifying that a person is an authorized holder of an identification card, badge or tag by comparing pattern image signatures extracted from an image of the bearer's face with corresponding data that was previously extracted from an image of the authorized holder's face and stored on an identification card, badge or tag carried by the person. Specifically, it is an objective of the invention to provide such method and apparatus for use with a conventional magnetic striped credit card or electrically powered tag.

It is a further object of the invention to provide display apparatus that generates an image of a person by combining data from a reference facial feature set that is stored in the display apparatus with other data stored on a card, badge, or tag carried by the person whose image is to be generated.

It is a specific object of the invention to provide method and apparatus for storing facial image identification data in a memory with a capacity of no more than 66 bytes.

It is yet a further object of the invention to provide a personnel identification system that includes
- a personal identity card having an image memory capacity of less than 120 bytes, wherein one may store encoded image parameters that are characteristic of an authorized card-bearer, and that are keyed to standard reference system,
- a card reader in which the identity card is manually moved past a read-out head,
- and a verification apparatus that contains a standard reference signature set combinable with the encoded image parameters to provide an image of the card-bearer's face.

DETAILED DESCRIPTION OF THE PREFERRED EMBODIMENT

Figure 1:
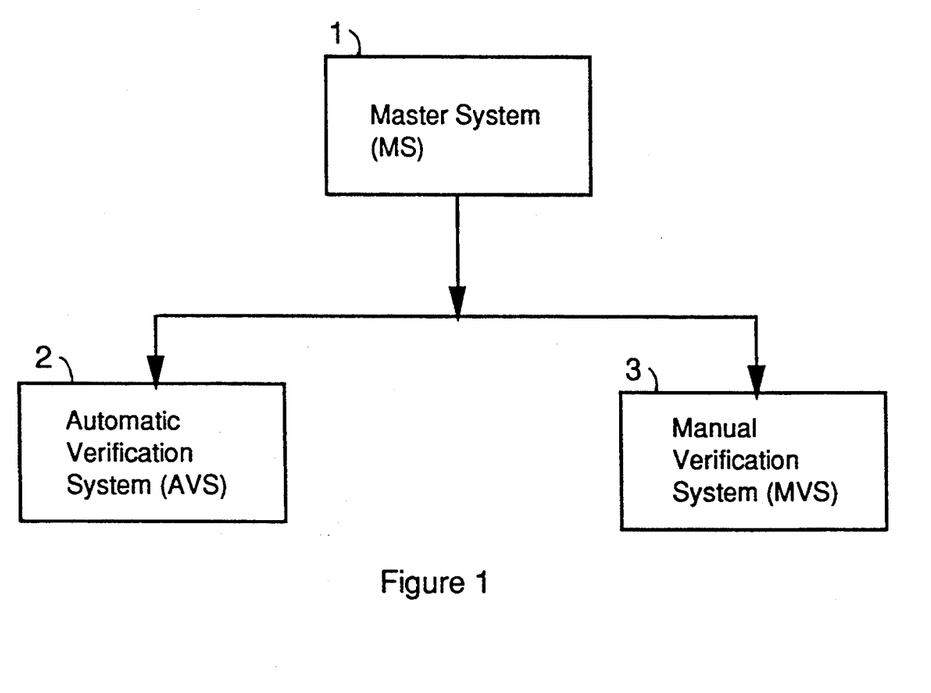
FIG. 1 of the drawing is a block diagram of three major functional elements used in the invention.

Turing initially to FIG. 1 of the drawing, one finds three major functional elements that are important in the process of verifying the identity of an individual. One of these functional elements 1, referred to as the Master System, is used when a system according to the invention is initially set up. After the initial set-up, this portion of the system is not expected to be needed unless the set of Eigenfaces that it generates is found to be inadequate and in need of revision.

Figure 2A:
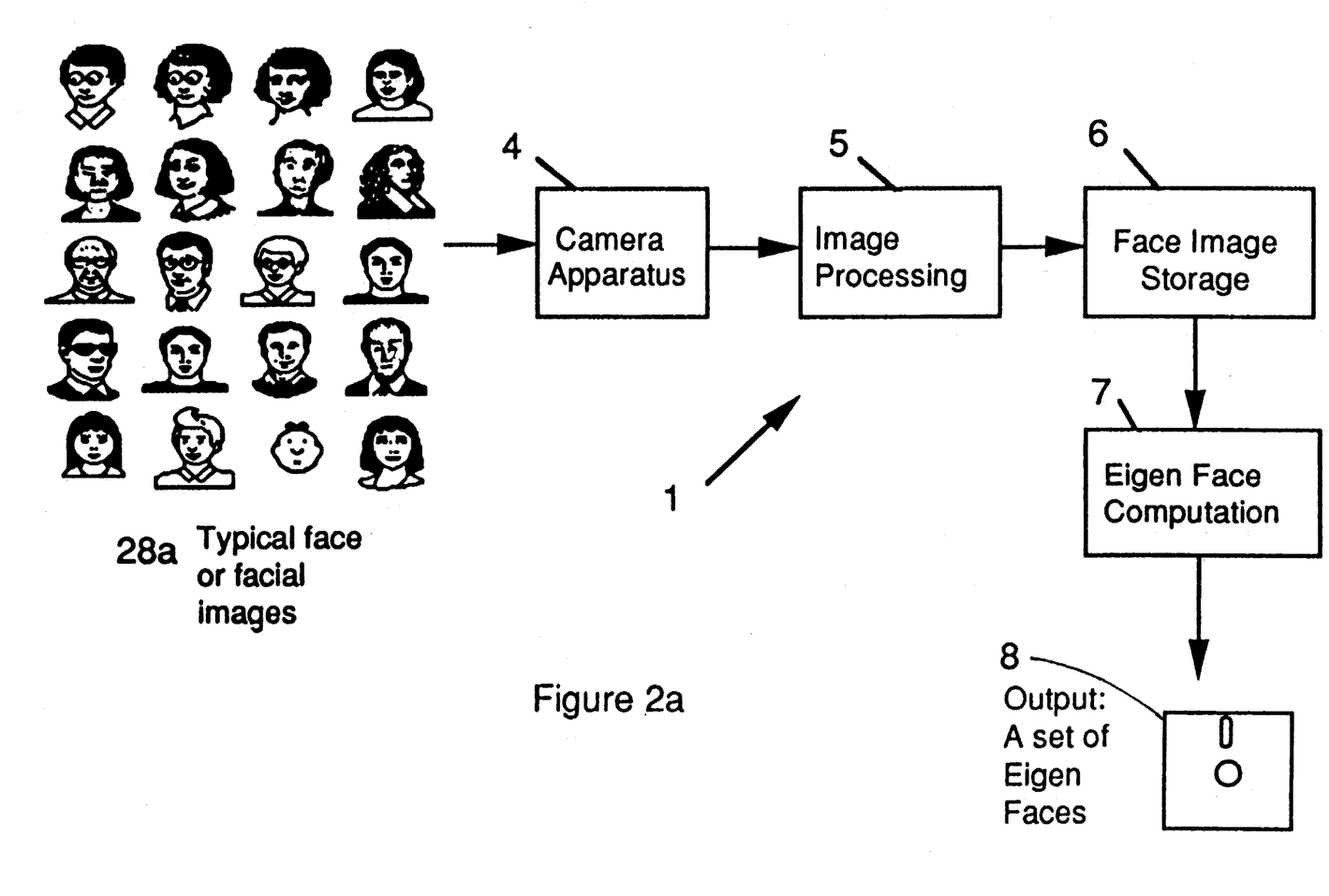
FIG. 2a of the drawing provides a detailed block diagram of an Eigenface variation of the "Master System" block of FIG. 1.
Figure 2B:
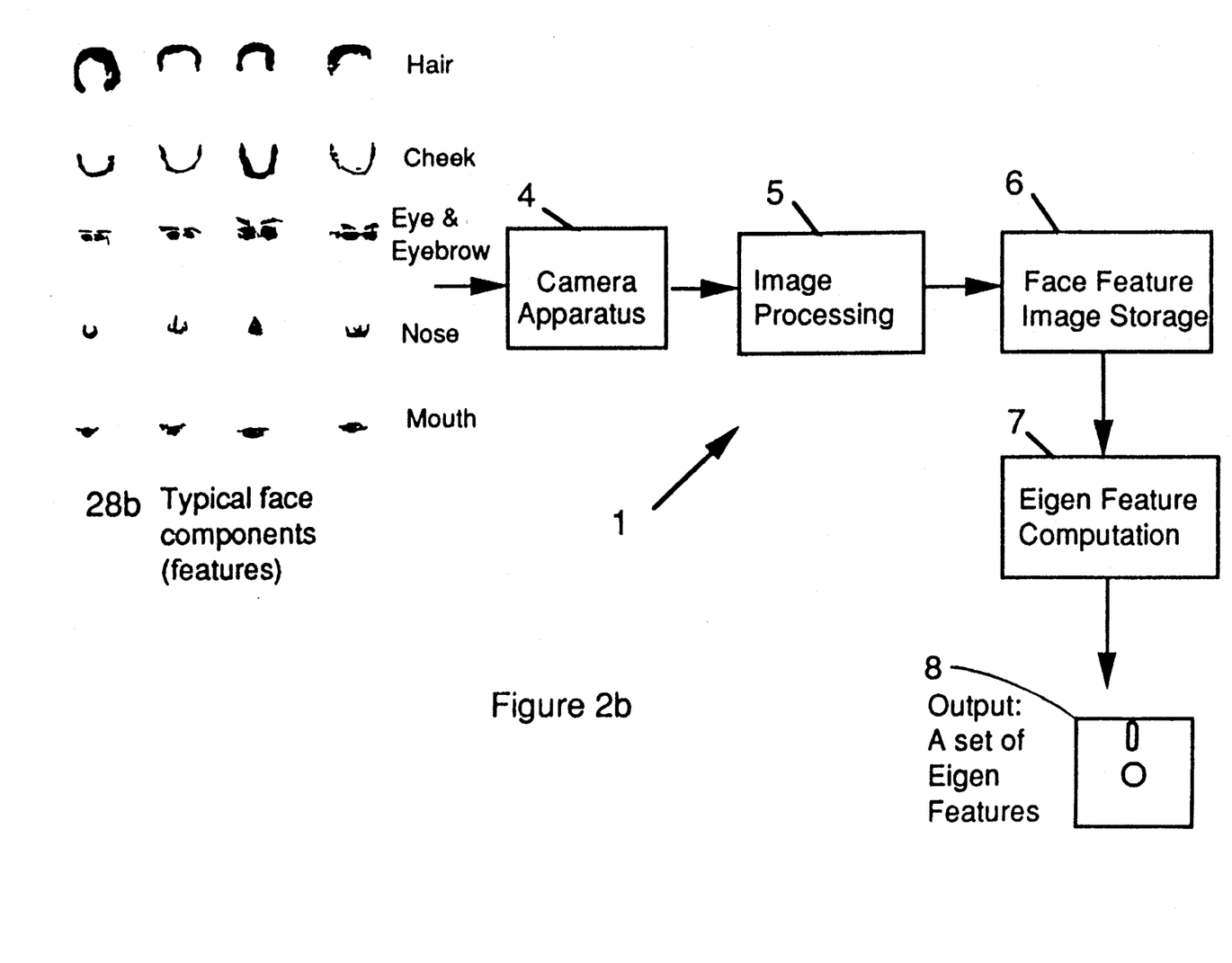
FIG. 2b of the drawing provides a detailed block diagram of an Eigenfeature variation of the "Master System" block of FIG. 1.

In the initial set-up, as shown in FIGS. 2a and 2b of the drawing, a number of people having a wide range of facial appearances (or, alternately, who have a wide range of facial features, such as ear shapes) are selected. A video camera apparatus 4 is used to obtain pictures of each of the selected individuals. Each of these images is subsequently digitized and processed (in step 5) according to processes that are known in the art and that are discussed at greater detail subsequently herein, and stored in a face image storage memory 6.

It should be noted that there are many possible degrees of overlap between the initial group of people who contribute to the Master data set and the second group of individuals whose identities are to be verified. It is possible, for example, to have the entire population of those whose identity is to be verified to contribute to the master set, as taught by Turk and Pentland in U.S. Pat. No. 5,164,992. The data processing required in a system of this sort to generate the master set could easily become unwieldy, but the system should have no problems in covering the entire range of features that were encountered, as all features would be represented in the master set. Since one can span a wide range of features by careful selection of the people who are to contribute to the master set, it is also possible to conceive of a more economical system in which none of the people used to generate the master set was in the second group (e.g. an industrial security system purchased by a company that did not happen to employ any of the small number of people who contributed to a master set that was defined by the system provider). In a case of considerable present interest, that of verifying the identity of a credit card holder, one would expect an intermediate and uncontrolled degree of overlap between the two groups—i.e. some fraction of the people who contributed to the master set would be expected to later apply for the credit card in question.

Figure 5:
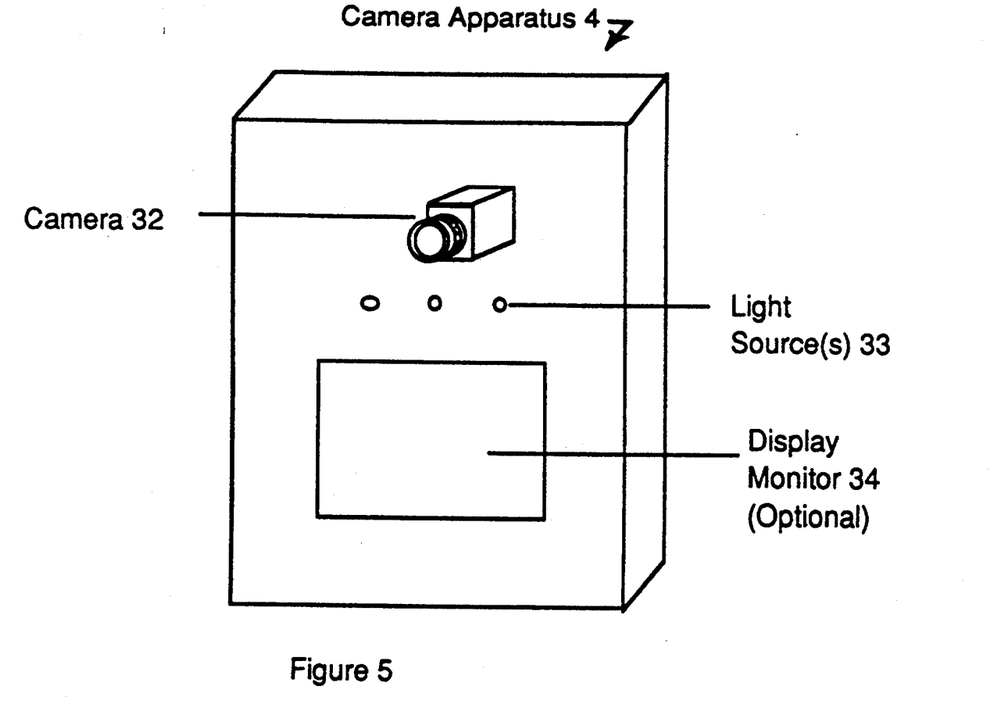
FIG. 5 of the drawing is a front elevational view of video camera apparatus used in the invention.
Figure 6:
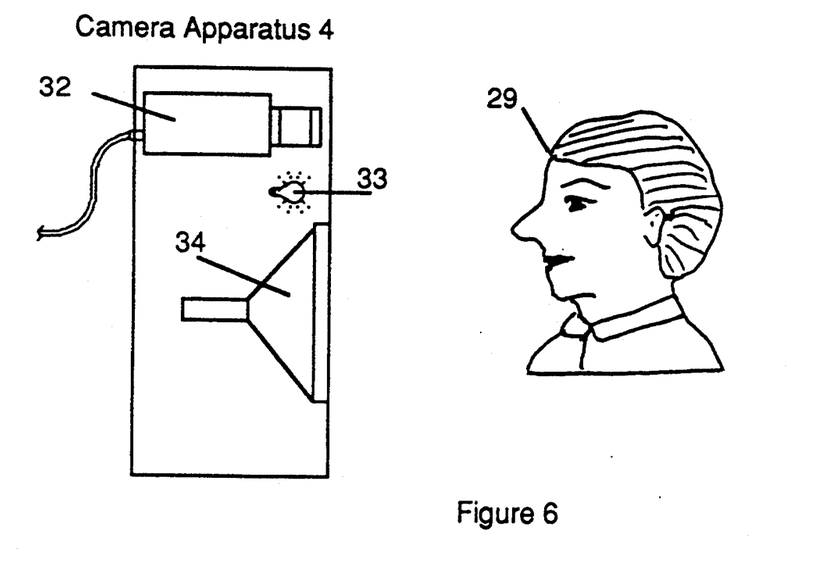
FIG. 6 of the drawing is a side cut-away view of video camera apparatus used in the invention.

The camera apparatus, shown in FIGS. 5 and 6 of the drawing, preferably includes covert near-infrared illumination so as to offer a minimal disturbance to the person who is being imaged. A video camera 32, such as the Model CI-21 which is made by the Canon Corporation, may be chosen for operation in the 870–950 nM spectral region. An illumination source 33 may be provided by an array of infrared emitting diodes (IREDs) with a maximum output at a wavelength of about 900 nM.

Figure 7:
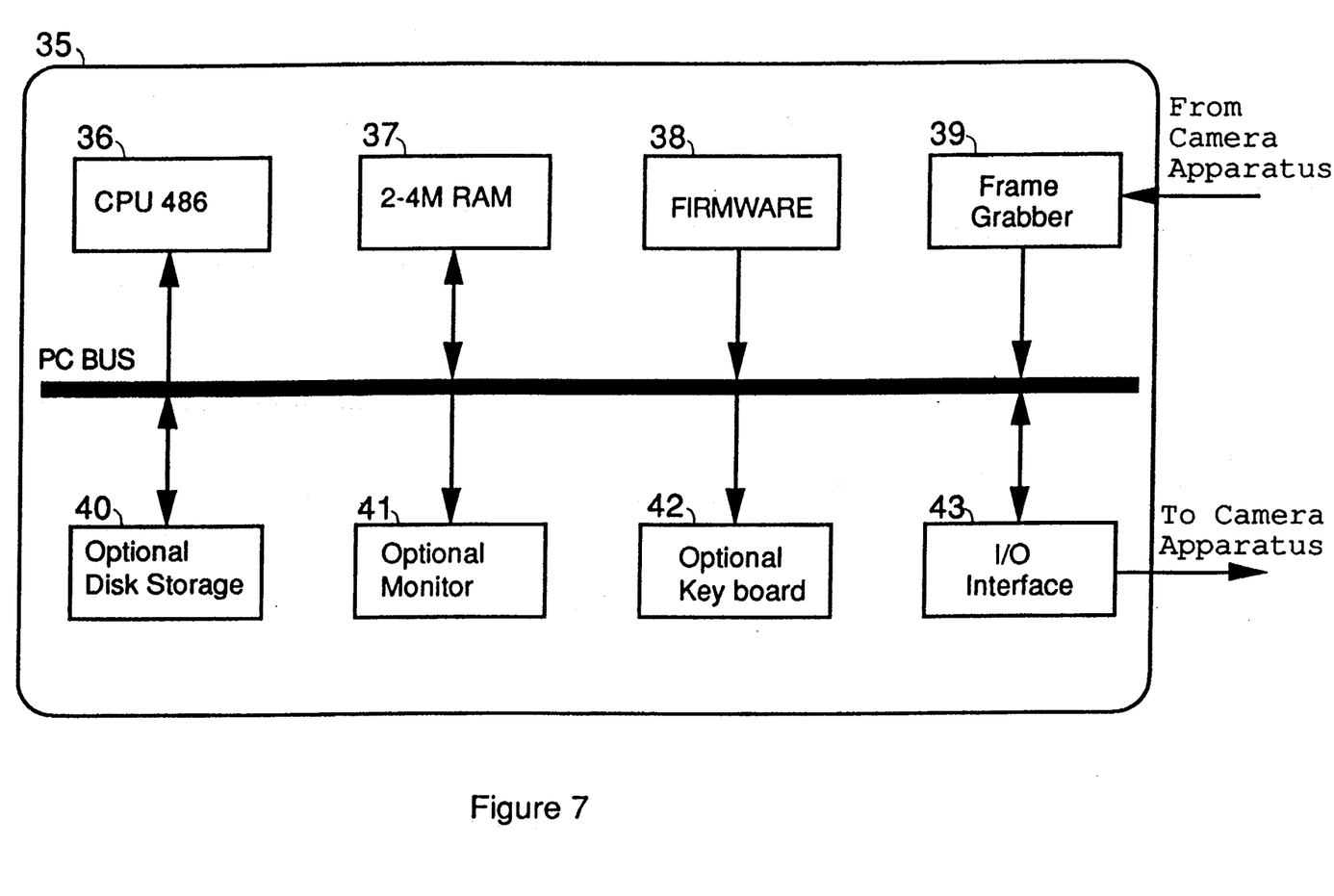
FIG. 7 of the drawing is a block diagram of the computational apparatus.

The images from the video camera 32 are processed in an image processing unit that includes a number of known items of apparatus and that is illustrated in FIG. 7 of the drawing. A frame grabber 39, which may preferably be a Model DT2853, made by Data Translation of Marlboro, Mass., can supply a digital image having 512×480 pixels with 64 gray levels per pixel. Image processing steps 5 applied to the digital image include intensity normalization, background deletion (to find the person in the scene), shade analysis (to detect the person's head shade), scale normalization (to bring this into a standard size) and face framing (to extract an elliptical facial image). These various steps have been discussed by Lu et al in U.S. patent application Ser. No. 07/872,881, the disclosure of which is herein incorporated by reference.

once the entire set of facial images has been collected, a set of stored facial images, generated by the image processing algorithms 5, is subjected to an Eigenface computational process, which has been described in the literature by: a) M. Kirby and L. Sirovich, "Application of the Karhuen-Loeve Procedure for the Characterization of the Human Face", Transactions on Pattern Analysis and Machine Intelligence. vol. 12, no. 1, 1990; b) M. Turk and A. Pentland, "Eigenfaces for Recognition", loc. cit; c) Turk and Pentland, U.S. Pat. No. 5,164,992; and d) Lu et al, U.S. patent application Ser. No. 07/572,881. This process results in the formation of a standard set of Eigenfaces 8. This master set 8, shown in FIGS. 2a and 2b, is selected to span the entire range of faces or facial features, respectively, that are to subsequently to be recognized by a verification portion of the system. It may be noted that increasing the number of Eigenfaces in a set can increase the precision of the subsequent identification operation.

It should be noted that although the foregoing discussion referred to a process that results in the creation of a set of Eigenfaces, one could equally well consider applying the same set of process steps to a selected set of facial features (e.g. eyebrows of varying shape, degrees of bushiness, etc.) that can be extracted from images of faces by using methods taught, inter alia., by Burt in U.S. Pat. No. 5,063,603 and by Tal in U.S. Pat. No. 4,975,969. Once all the images of physical attributes have been collected and processed by the image processing algorithms 5, these data are subjected to an Eigenfeature computational process 7, shown in FIG. 2b, that is the same as the Eigenface process described previously with reference to FIG. 2a. This calculational process forms a standard set of principal facial feature components, or "Eigenfeatures". The ensuing discussion will be directed at the use of Eigenfaces, but it should be understood that similar approaches can be used, by following well-established mathematical theory, to verify the identity of an individual based on a standard Eigenfeature set derived from a selected set of images of identifying features, as shown as 28b in FIG. 2b.

If a satisfactory set of faces has been chosen for the Master Set 8, any new face can be represented as a weighted combination of data from the Master Set 8. For example, if a person is to be enrolled in the group of those individuals whose identity can be verified by the invented system, an image of his or her face (29 in FIG. 3)—e.g. of a person who has presented other acceptable means of identification, such as a driver's license or passport, and who is to be accepted to have his/her identity subsequently verified by the system of the invention—can be acquired with camera and illumination equipment 4 that are similar to what was used for acquiring the images in the Master set 8. This image is then processed in step 5 according to the same algorithms used to form the Master set 8, in order to form a new set of image signatures. The new set of image signatures is subjected to another set of algorithms 11 to express this new signature set as a weighted combination of the elements of the Eigenface or Eigenfeature set. The resultant set of weights, which is referred to as a set of Eigenface Eigenfeature Parameters (or "EFP"), is then stored in escort memory (as indicated by output path 13, shown in phantom in FIG. 3) for subsequent use as identification parameters in the verification process. In this context, the camera apparatus 4, image processing apparatus 5, master set 8, EFP extraction apparatus 11 and ID card writer 12 function as enrollment apparatus.

Figure 8:
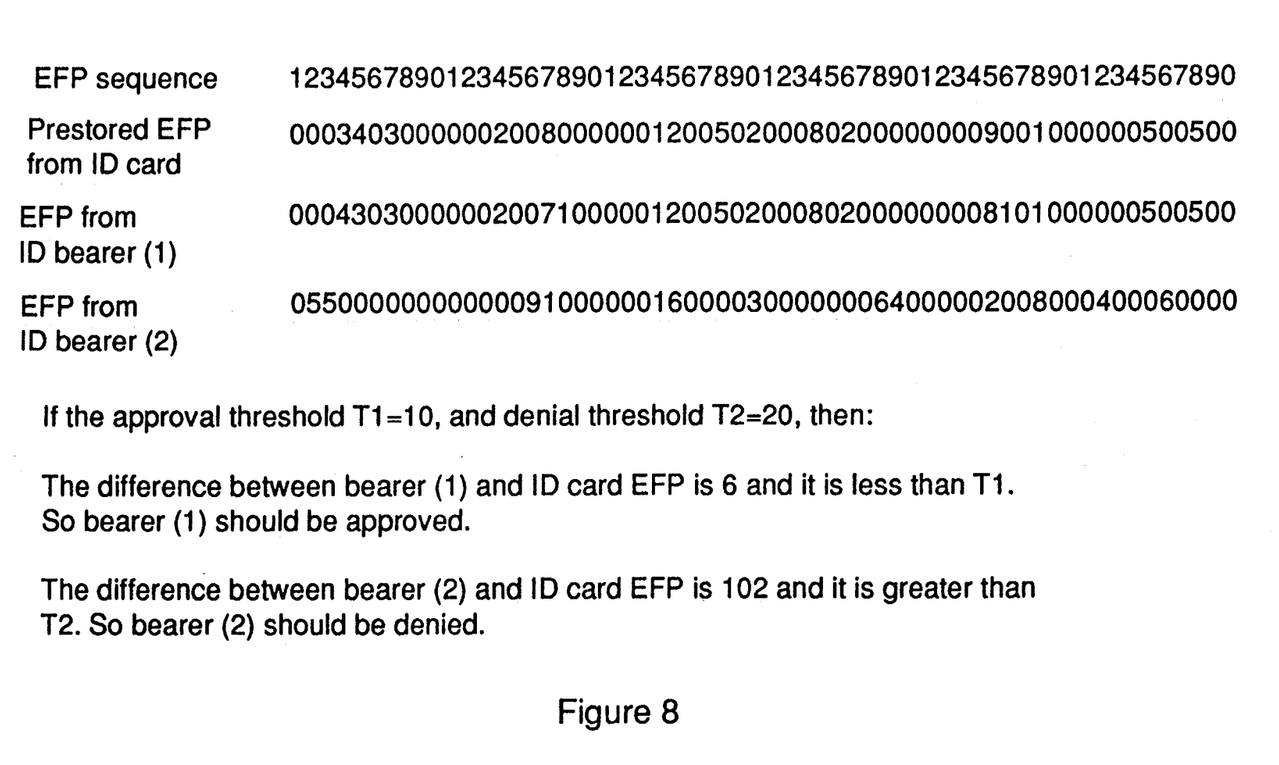
FIG. 8 of the drawing provides a sample set of Eigenface Parameters.

A key feature of the current invention arises from the observation that the use of Eigenface parameters is compatible with a very small memory. Turning now to FIG. 8 of the drawing, one finds a set of Eigenface parameters that is adequate for use in identifying an individual. This set can be stored in less than 60 bytes of memory. Since Track 3 of a magnetic stripe on a conventional credit card, i.e. one that is made in accordance with the ISO 7811-5standard, has a capacity of 66 bytes, the Eigenface parameter set of FIG. 7 could be stored on Track 3 of a conventional magnetic stripe.

Thus, one can configure both manual and automatic verification systems, generally indicated as 2 and 3 in FIG. 1 of the drawing, that use Eigenface parameters. In all of these systems, as will be made clear in the subsequent discussion, an individual whose identity is to be verified is given an escort memory (e.g. a credit card with a magnetic stripe) that contains a set of Eigenface parameters derived from an image of his face. Each verification station has a much larger capacity memory that contains a master set of Eigenfaces 8.

Figure 3:
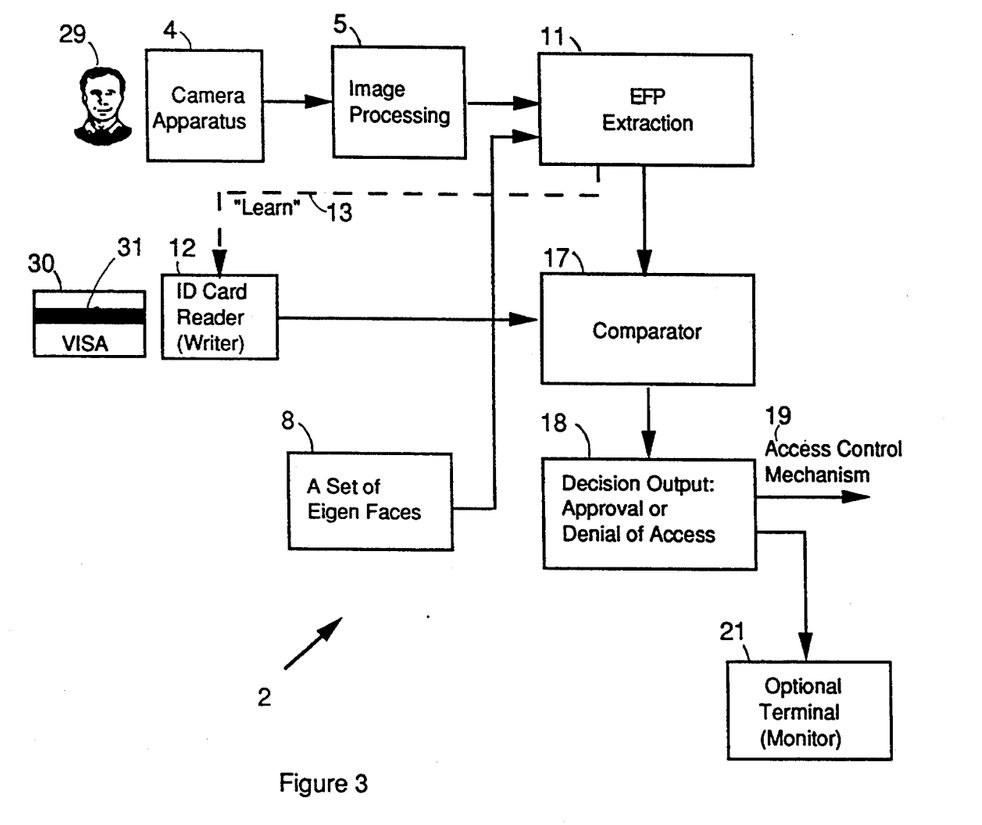
FIG. 3 of the drawing is a detailed block diagram of the block that is labelled "Automatic Verification System" in FIG. 1.
Figure 4:
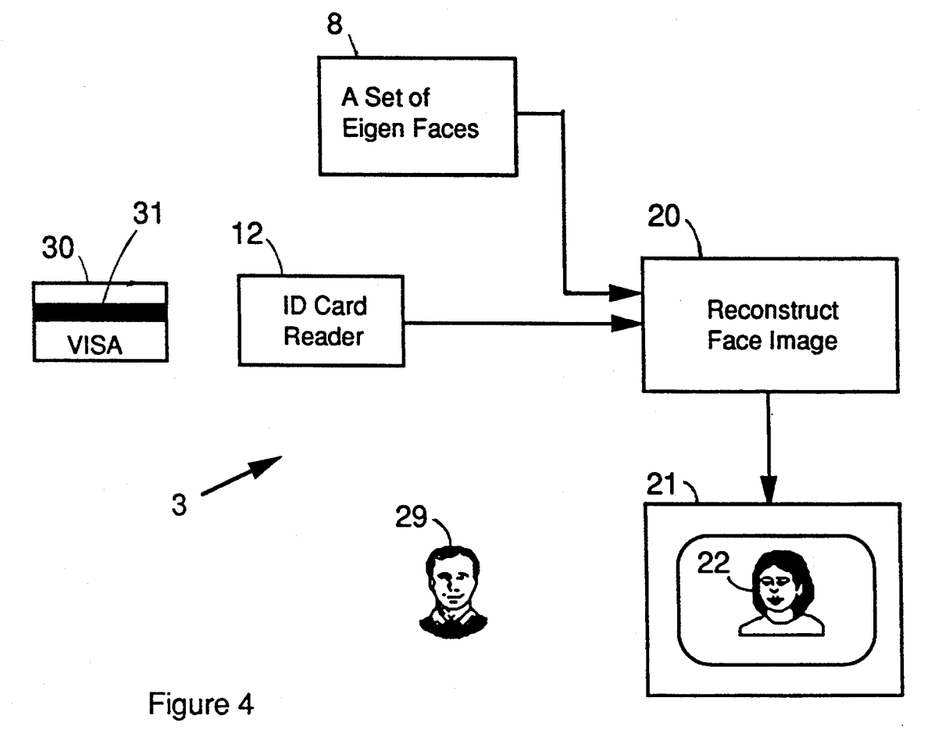
FIG. 4 of the drawing is a detailed block diagram of the block that is labelled "Manual Verification System" in FIG. 1.

The manual system 3 of FIG. 1 is illustrated in greater detail in FIG. 4 of the drawing. A verification station includes a computer system 35 adapted to reconstruct a face image, as shown in block 20 of FIGS. 3 and 4 and that has a memory (e.g. shown as block 40 in FIG. 7) in which a master set 8 of Eigenfaces is stored. When a person whose identity is to be verified presents himself, his escort memory (e.g. a magnetic stripe on a credit card 30) is read by a card reader 12. The Eigenface parameter set from the escort memory 31 is combined with the master face set 8 to regenerate an image of a face. This regenerated image 22 is displayed on terminal 21 so that an operator (not shown) can compare the regenerated image 22 with the face of the person 29 in order to validate his or her identity. Regeneration of the image for manual recognition by an operator is done with methods taught, inter alia, by Hsu in U.S. Pat. No. 5,031,155.

The automatic system 2 of FIG. 1 is illustrated in greater detail in FIG. 3 of the drawing. A verification station includes a memory in which a master set 8 of Eigenfaces is stored. When a person 29 whose identity is to be verified presents himself, his escort memory 31 is read by card reader 12 and an image of his face is obtained with video camera apparatus 4. This image is processed, to yield a current set of Eigenface parameters, with the same image processing algorithms 5 and Eigenface parameter extraction algorithms 11 used to generate the Eigenface parameter in the cardholder's escort memory 31. A comparison (by comparator 17) with the Eigenface parameters that were previously read from the escort memory is then employed to validate the cardholder's identity. This may be better understood with reference to FIG. 8 of the drawing which shows a two similar sets of Eigenface parameters from two different individuals. It should be noted that minor differences, associated with changes in facial appearance as well as in illumination etc., are to be expected, so that some sort of formal decision making process 18 is required to decide if the two sets of Eigenface parameters represent the same face—i.e. if the person 29 is indeed the authorized holder of the identification card with escort memory 31.

The operation performed by comparator 17 consists of a comparison of the current set of Eigenface Parameters with the EFP extracted from the cardholder's image at the time the card was originally authorized. If the difference, which is based on a sum of absolute differences, is less than a predetermined threshold, (e.g., as described by Turk et al. in the paragraph beginning at Line 57 of Column 6 of their U.S. Pat. No. 5,164,992) the decision output module 18 will issue an authorization message 19 that allows e.g. access to a controlled area, permission to pay for a purchase by check, etc. If, on the other hand, the calculated distance is greater than a second threshold, the decision module 18 will deny authorization for whatever the controlled action of the system happens to be. If the calculated distance lies between the first and the second threshold, the decision module 18 will issue a message (displayable e.g. on terminal 21) that additional face imagery is needed to make the decision.

It should be noted that each verification station in the automatic system described above has substantially all the technical capabilities needed for originally collecting image data that can subsequently be used to verify a person's identity. Thus, if a person whose identity is to subsequently be verified provides adequate identification (e.g. a birth certificate) on one occasion at a verification station, and if that verification station is equipped to prepare an identification card (e.g. by embossing a name and identification number on the card, taking and laminating a photo to the card, etc.) and has a card reader that can also function as a card writer, then that verification station can be used as an enrollment apparatus to add a person to the list of people who can be recognized by the system. That is, a verification station may be also function as a location for collecting initial image data, if so desired, by the addition of such other known equipment as may be needed for generating selected indicia to accompany the escort memory 31.

A further advantage of the apparatus offered in the present invention is that no communication is needed between a verification station and a central database. That is, since each verification station has both a copy of the master eigenface set 8 and all the necessary algorithms, and since each escort memory unit has a copy of the eigenface parameters relating to a specific person, all the data required for verification of identification are present at the time and place where verification is requested.

It will be appreciated by those skilled in the art that several practical alternatives exist to the use of a magnetic stripe on a card as the escort memory. One could, for example, consider the use of a transponding tag, such as those discussed by Kiewit in U.S. Pat. No. 4,930,011. In a case such as this, a person whose identity was to be verified would wear a small tag that would receive low power, short range interrogation signals (which may be radio, acoustic or intrared signals) emanating from a verification station. When interrogated, the tag would respond by transmitting escort memory data (e.g. stored in a CMOS RAM memory) to the verification station by appropriate means (e.g. coded flashes from an infrared emitting diode). Thus, the benefits of the verification system could be offered in a more expeditious way that did not require the person whose identity was to be verified to stop, hand over a card, and retrieve the card before proceeding with his or her business.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is desired to be secured by Letters Patent is:

1. A system for automatically verifying the identity of a predetermined individual who is a member of a first set of individuals, and who is not a member of a second set of individuals, said system comprising:
   a) master set apparatus acquiring a set of images, one from each individual member of said second set of individuals, and generating, by means of a first algorithm, a master set of principal component image signatures;
   b) enrollment apparatus having a copy of said master set in a first computer memory, said enrollment apparatus
      acquiring an enrollee image of the predetermined individual, generating, by means of a second algorithm, from said enrollee image and said master set, a set of identification parameters and storing said set of identification parameters in an escort memory associated with the predetermined individual;

c) automatic verification station apparatus having a copy of said master set in a second computer memory, said automatic verification station apparatus acquiring a current image of a bearer of said escort memory, generating, by means of said second algorithm, from said current image and said master set, a current set of verification parameters, reading said stored set of identification parameters from said escort memory and comparing, by means of a third algorithm, said identification parameters with said verification parameters, and verifying that the bearer is the predetermined individual if the identification parameters differ from the verification parameters by less than a predetermined amount.

2. A system for verifying the identity of a predetermined individual who is a member of a first set of individuals, said system comprising:

a) master set apparatus acquiring an image of each individual member of a second set of individuals, said second set not including said predetermined individual as a member, and generating therefrom, by means of a first algorithm, a master set of principal component image signatures;

b) enrollment apparatus having a copy of said master set in a first computer memory, said enrollment apparatus acquiring an enrollee image of the predetermined individual, generating, by means of a second algorithm, from said image of the predetermined individual and said master set, a set of identification parameters, and storing said set of identification parameters in an escort memory;

c) verification station apparatus, having a copy of said master set in a second computer memory, said verification station apparatus reading said stored set of identification parameters from said escort memory, constructing, by means of a third algorithm, from said set of identification parameters and said master set, an image corresponding to the predetermined individual, and displaying said image.

3. A method of verifying a predetermined person's identity comprising the steps of a) acquiring an image of a characteristic feature from each of a group of individuals, said group of individuals not containing said predetermined person as a member, and constructing a master set of principal component feature signatures from said images by means of a first algorithm;

b) acquiring an image of said predetermined person, c) creating from said image of said predetermined person and said master set, by means of a second algorithm, a set of identification parameters;

d) storing said set of identification parameters in an escort memory;

e) reading, from said escort memory at a verification station, said set of identification parameters;

f) acquiring, at said verification station, a second image of said predetermined person, and constructing from said second image of said predetermined person and said master set by means of said second algorithm a set of verification parameters; and g) comparing, by means of a third algorithm, said verification and said identification parameters, and verifying the predetermined person's identity if the identification parameters differ from the verification parameters by less than a predetermined amount.

4. A method of verifying a predetermined person's identity comprising the steps of a) acquiring an image of a characteristic feature from each of a group of individuals, said predetermined person not a member of said group, and constructing from said images, by means of a first algorithm, a master set of principal component feature signatures;

b) acquiring an image of said predetermined person, c) creating from said image of said predetermined person and said master set, by means of a second algorithm, a set of identification parameters;

d) storing said set of identification parameters in an escort memory;

e) reading, from said escort memory at a verification station, said set of identification parameters;

f) constructing, by means of a third algorithm, from said identification set and said master set, a verification image; and g) displaying said verification image.

* * * * *